(12) United States Patent
Vosgeois et al.

(10) Patent No.: US 10,228,084 B2
(45) Date of Patent: Mar. 12, 2019

(54) CLAMPING SYSTEM COMPRISING A COLLAR AND INDIVIDUAL PRE-ATTACHMENT CLIPS

(71) Applicant: ETABLISSEMENTS CAILLAU, Issy les Moulineaux (FR)

(72) Inventors: Cyril Vosgeois, Romorantin (FR); Fabrice Prevot, Selles sur Cher (FR); Nicolas Rigollet, Romorantin (FR); Patrick Goulet, Gievres (FR)

(73) Assignee: Etablissements Caillau (FR)

( * ) Notice: Subject to any disclaimer, the term of this patent is extended or adjusted under 35 U.S.C. 154(b) by 147 days.

(21) Appl. No.: 15/448,935

(22) Filed: Mar. 3, 2017

(65) Prior Publication Data

US 2017/0254454 A1   Sep. 7, 2017

(30) Foreign Application Priority Data

Mar. 7, 2016  (FR) ...................... 16 51881

(51) Int. Cl.
*F16L 23/08*  (2006.01)
*F16L 23/00*  (2006.01)
*F16L 23/04*  (2006.01)

(52) U.S. Cl.
CPC ............. *F16L 23/08* (2013.01); *F16L 23/003* (2013.01); *F16L 23/04* (2013.01)

(58) Field of Classification Search
CPC .......... F16L 23/08; F16L 23/003; F16L 23/04
USPC ................................................ 285/23, 410
See application file for complete search history.

(56) References Cited

U.S. PATENT DOCUMENTS

| | | | | |
|---|---|---|---|---|
| 4,453,289 A | * | 6/1984 | Kleykamp | F16L 33/22 285/23 |
| 6,832,786 B2 | * | 12/2004 | Duncan | F16L 33/04 285/109 |
| 7,770,937 B2 | | 8/2010 | Ignaczak et al. | |
| 2017/0292643 A1 | * | 10/2017 | Prevot | F16L 59/184 |

FOREIGN PATENT DOCUMENTS

| | | |
|---|---|---|
| DE | 198 38 588 A1 | 3/2000 |
| EP | 1 451 498 B1 | 3/2006 |
| EP | 2 598 785 A1 | 5/2013 |

OTHER PUBLICATIONS

EPO Report, dated Aug. 19, 2016, Xavier Durrenberger, for FR Patent Application No. 1651881, 2 pages.

* cited by examiner

*Primary Examiner* — David Bochna
(74) *Attorney, Agent, or Firm* — Fay Sharpe LLP; James E. Scarbrough

(57) ABSTRACT

The clamping system comprises a collar (10) having a band (12) that has two flanks (13A, 13B), between which an inside trough (14) is defined that receives projecting clamping surfaces (1A, 2A) of two tubes (1, 2) to be assembled together. The system further comprises a plurality of individual retaining clips (20) distributed angularly around the first flank (13A), each clip having an inside branch (30) and an outside branch (32) facing each other, and between which the first flank is pinched, and a retaining portion (34) that, in the pre-attached state, is suitable for co-operating with the clamping surface (1A) of the first tube (1), one of the branches carrying a first bearing zone (36) that co-operates with a first bearing surface (13'A) of the collar that faces towards the axis (A) of said collar.

20 Claims, 11 Drawing Sheets

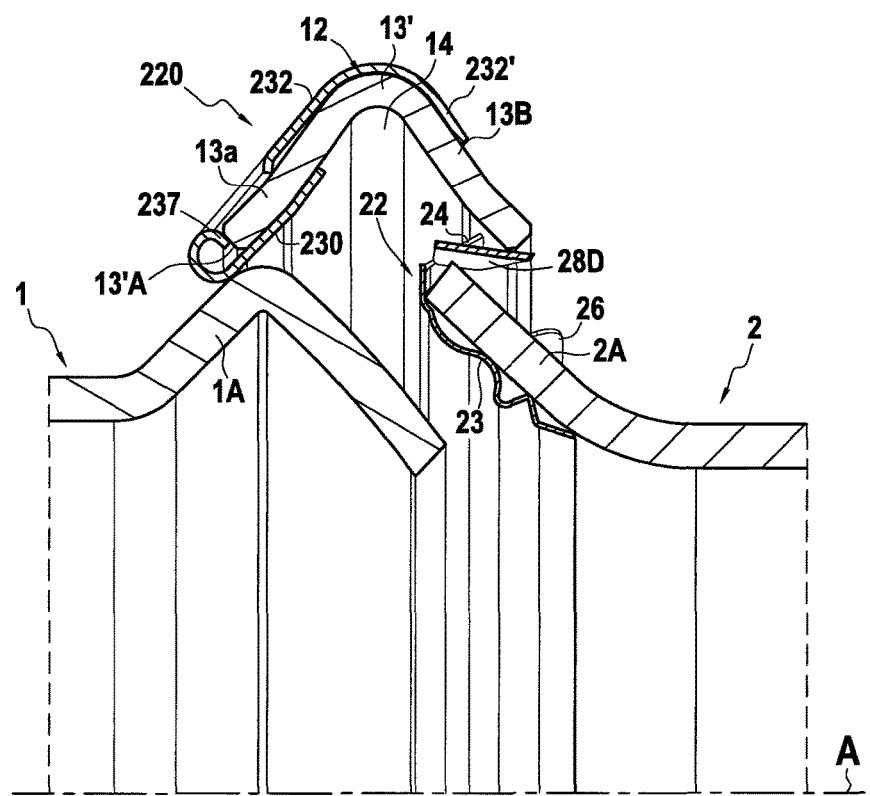
FIG.7A
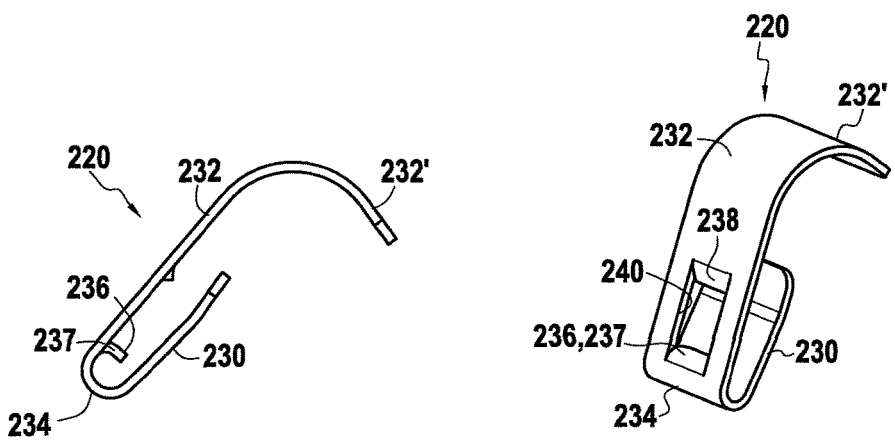
FIG.7B
FIG.7C

CLAMPING SYSTEM COMPRISING A COLLAR AND INDIVIDUAL PRE-ATTACHMENT CLIPS

CLAIM OF PRIORITY

This application claims priority from French Patent Application No. FR1651881, filed on Mar. 7, 2016 and is incorporated herein by reference in its entirety.

BACKGROUND OF THE DISCLOSURE

The present disclosure relates to a clamping system for connecting two tubes together in sealed manner, the facing ends of the two tubes having clamping surfaces that project relative to the cylindrical outside surfaces of said tubes, the system comprising a collar having a band suitable for co-operating with said clamping surfaces and means for tightening said band, the band having a first flank and a second flank between which an inside trough is defined that is suitable for receiving the clamping surfaces.

A clamping system of this type is known from European Patent No. EP 1 451 498. The cross-section of the band of the collar is, for example, substantially V-shaped or U-shaped, so that the branches formed by the cross-sectional shape bear respectively against the clamping surface of the first tube and against the clamping surface of the second tube. Thus, tightening the collar tends to hold the tubes clamped one against the other. A V-shaped cross-section is advantageous insofar as, when the collar is tightened, it urges the tubes together.

For example, the means for tightening the band of the collar comprise a nut-and-bolt system. Thus, the ends of the band can be turned out so as to form bearing tabs provided with holes through which a bolt can be inserted. The head of the bolt is retained relative to one of said tabs, while a nut is retained relative to the other tab, so that the bolt and the nut being turned relative to each other causes the band to be tightened. However, other tightening means may be provided, e.g. of the type operating by hooking, and in particular of the type comprising a hook that is turned out relative to the band and a lug also turned out relative to the band, the hook hooking behind the lug to keep the collar in the tightened state. In EP 1 451 498, the clamping system further comprises a washer that is secured to the collar by means of fastening tabs provided on the washer, which also has tabs suitable for holding onto the first tube when the collar is pre-attached to the end of said first tube. In the meaning of the present description, "pre-attached" means that the tube is merely engaged into the collar, without said collar being tightened. Thus, retaining the collar in the pre-attached state around the end of the first tube makes it possible to keep it on standby before butting the two tubes together and tightening the band of the collar around their assembled-together ends.

European Patent No. EP 2 598 785 proposes equipping the system with first and second pre-attachment means for pre-attaching the collar to the first and second tubes, once they have been brought together and engaged in the collar. That makes it possible to tighten the band without having to hold the two tubes in position. In that patent, the first and second pre-attachment means may be formed on a single washer carried by the band of the collar, in particular by its first flank, or indeed by two washers, namely a first washer analogous to the washer of the system described in Patent EP 1 451 498, and carried by the first flank, and a second washer carried by the second flank.

The above-mentioned devices are generally satisfactory, but they require one or two washers to be used to achieve the pre-attachment. Since those washers have inside peripheries that are analogous to the inside periphery of the collar, they represent a relatively large quantity of material. In addition, their geometrical shapes are relatively complex so as to enable them not only to be held correctly relative to the band of the collar over their entire peripheries, but also to retain the ends of the respective tubes with which they co-operate correctly relative to the collar. In addition, under certain circumstances, the washer needs to also provide a function other than the pre-attachment function, e.g. a sealing function. Under certain circumstances, that function can be provided only if the washer has a precise thickness, which is not always compatible with the springiness that the pre-attachment tabs need to have in order to perform their function, it being understood that, in principle, said tabs have the same thickness as the washer because they are made from the same strip of material.

In the particular situation of the tubes being assembled together by a ball joint, U.S. Pat. No. 7,770,937 is also known and it recommends, for achieving the pre-attachment, either welding one of the tubes to an axial bracket that is retained relative to the band of the collar, or welding the band of the collar to a clip that extends over a portion of the circumference of said band and that has fingers that come to hook behind the clamping surface of one of the tubes. That patent also suggests using individual fingers fastened to the band in such a manner as to form extensions that extend relative to the edge of said band and that can come to hook onto the clamping surface of a tube. Such individual fingers are only provided outside the band, and, like the clip, they are welded to the outside periphery of the band. Thus, the pre-attachment means that U.S. Pat. No. 7,770,937 proposes are relatively voluminous on the outside of the collar and suffer from the drawback of requiring a welding operation either on the outside periphery of the collar, or on one of the tubes. Naturally, such an operation requires that the appropriate material is available, either on the production line on which the collar is manufactured, or on the assembly line on which the collar is assembled with the tubes. Welding is an operation that is very distinct from the other operations required for manufacturing the collar or for assembling it with the tubes, and can damage the surface of the parts in question.

SUMMARY OF THE DISCLOSURE

The present description aims to improve the above-mentioned state of the art.

Thus, the present disclosure provides a clamping system for connecting two tubes together in sealed manner, the facing ends of the two tubes having clamping surfaces that project relative to the cylindrical outside surfaces of said tubes, the system comprising a collar having a band suitable for co-operating with said clamping surfaces and for being tightened, the band having a first flank and a second flank between which an inside trough is defined that is suitable for receiving the clamping surfaces, the system further comprising a plurality of individual retaining clips distributed angularly around the first flank, each clip having an inside branch and an outside branch facing each other, and between which the first flank is pinched, and a retaining portion situated radially further towards the inside, one of said branches carrying a first bearing zone that co-operates with a first bearing surface of the collar that faces towards the axis of said collar, for resiliently urging the clip back towards the axis of the collar in such a manner that the retaining portion is suitable for co-operating with the clamping surface of the first tube to retain the collar in a pre-attached state in which it is pre-attached to said tube while limiting movement of the collar relative to the first tube in the direction going towards the free end of said first tube, which end is provided with the clamping surface of said first tube.

Thus, in the present disclosure, the pre-attachment is achieved by means of individual clips that pinch the first flank of the collar so that each of them is carried by said first flank, and has a retaining portion that co-operates with the clamping surface on the first tube to achieve the pre-attachment. Putting these individual clips in place on the first flank is therefore extremely simple and does not require any welding operation. In particular, said clips are elastically deformable and they are put in place simply by placing them on the first flank in such a manner that the first flank is inserted between the inside and outside branches of the clips that deform elastically to allow this insertion to take place, so that the clips act in the manner of pinching clips by pinching the first flank. Once the clips are in place on the first flank, the end of the first tube can be inserted into the clamping system. Whereupon, said end pushes the clips radially outwards, so that the clips retract in part to allow the clamping surface of the first tube to go past. However, by means of its first bearing zone that co-operates with the first bearing surface of the collar, a clip that has retracted returns resiliently to its pre-attachment position, in which it is urged back towards the axis of the collar, so that the retaining portion can co-operate with the clamping surface on the first tube to hold it in the pre-attached state. A plurality of clips may be distributed angularly around the first flank. In general, it suffices to provide two, three, or four clips. The retaining portions of the various clips placed in this way project relative to the inside edge of the first flank, towards the axis of the collar. When the clips are in the rest situation, said retaining portions define between them diametrical dimensions that are less than the maximum diametrical dimensions of the clamping surface of the first tube. The retaining portions move away from the axis of the collar when the end of the first tube is inserted into the collar, and then the clips return to a position in which their retaining portions project sufficiently towards the axis relative to the edge of the first flank to define a pre-attachment diameter, which is less than the maximum diameter of the clamping surface of the first tube.

By thus using a plurality of individual clips, the quantity of material is reduced relative to a situation in which a pre-attachment washer is used instead of the clips. In addition, if the clamping system includes a washer, e.g. for providing a sealing function, the sealing function and the pre-attachment function can be dissociated and different thicknesses of materials can be used for the washer and for the clips, which makes it possible, in particular, to use clips that are sufficiently strong while also having a washer that is very deformable for providing a sealing function. Finally, it is possible to use individual clips for pre-attaching the collar to the first tube, while also using a washer for the pre-attachment to the second tube. This washer may, for example, provide two functions, namely pre-attachment to the second tube (possibly less demanding mechanically than the pre-attachment to the first tube), and sealing of the connection between the tubes.

Optionally, the first bearing surface of the collar is formed on the inside edge of the first flank.

Thus, the collar of the clamping system may be a standard collar, the clips merely bearing against its inside edge.

Optionally, for at least one of the clips, the first bearing zone is formed on a bearing tongue cut out from one of the inside and outside branches.

This cutting-out is a simple operation that can be done without any material being removed or with some material being removed, leaving a tongue in the cutout, which tongue can be folded for forming the first bearing zone.

Optionally, the bearing tongue is cut out from the outside branch and projects into the inside space of the clip between the inside and outside branches, at least via its free end.

Optionally, the bearing tongue is connected to the outside branch in the vicinity of the junction where the inside and outside branches meet.

Optionally, the bearing tongue is connected to the outside branch in a connection zone remote from the junction where the inside branch and the outside branch meet, and has a running portion that extends from said connection zone towards said junction and an end portion folded over into the inside space of the clip, between its inside and outside branches.

Optionally, the bearing tongue is cut out from the inside branch and projects into the inside space of the clip between the inside and outside branches, at least via its free end.

Optionally, the free end of the bearing tongue is curved over towards in the inside branch and is suitable for co-operating with the first bearing surface of the collar via a surface coming from the face of the inside branch that faces away from the outside branch.

Thus, a plurality of embodiments can be provided for a bearing tongue while also enabling the clip to remain of very simple geometrical shape that requires little material.

Optionally, for a clip having a first bearing zone of the above-mentioned type, co-operating with a first bearing surface of the collar, the inside branch has a free end portion that is curved over inwards and that forms a second bearing zone that is suitable, via its outside surface, for co-operating with the end-wall of the inside trough of the band, on which end-wall a second bearing surface of the collar is formed.

The clip then has two bearing zones. In particular, when the first bearing zones are of the above-mentioned type, and when the first bearing surface of the collar is formed on the inside edge of the first flank, the collar can be of the standard type, the second bearing zone co-operating simply with the end-wall of the inside trough in the band.

However, the inside branch having a curved-over free end may form the first bearing zone. Thus, optionally, the inside branch of at least one of the clips has a free end portion that is curved over inwards and that forms the first bearing zone that is suitable, via its outside surface, for co-operating with the end-wall of the inside trough of the band, on which end-wall the first bearing surface of the collar is formed.

The clip may then not be provided with a bearing tongue of the above-mentioned type, the first bearing zone being formed merely by the free end portion, which co-operates with the end-wall of the inside trough in the band, it being possible for the collar to be a standard collar.

Optionally, the outside branch of at least one of the clips has a free end portion that is curved over inwards and that is suitable for covering the junction zone where the first and second flanks of the band meet.

This outside branch then constitutes additional means for securing the clip to the band of the collar, in addition to the pinching of the first flank between the inside and outside branches as described above.

Optionally, remotely from where it is connected to the outside branch, the inside branch of at least one of the clips has a pinching portion that comes back towards the outside branch.

The pinching is then achieved between the outside branch and the pinching portion coming from the inside branch. Thus, the portions of the inside branch other than the pinching portion may be remote from the inside surface of the first flank, while also enabling the pinching to be effective.

Optionally, the pinching portion is formed by a pinching tongue, cut out from the inside branch and also forming the first bearing zone that co-operates with the inside surface of the first flank on which the first bearing surface of the collar is formed, the pinching tongue facing, in particular, away from the axis of the collar.

The pinching tongue thus serves both to achieve the pinching serving to hold the clip on the first flank of the collar, and also to form the first bearing zone that, by reacting with the first bearing surface of the collar, tends to urge the retaining portion back resiliently towards the axis of the collar to enable the collar to be pre-attached to the first tube.

Optionally, the retaining portion of at least one of the clips is formed at the junction where the inside and outside branches meet.

The retaining portion is mechanically strong, in particular by means of work-hardening effected by folding the clip at the junction where the inside and outside branches meet. This retaining portion may have a surface without a clear-cut edge, and that can easily slide over the free end of the first tube while the collar is being engaged around said first tube, and that can co-operate with the clamping surface of the first tube without damaging it.

Optionally, the retaining portion of at least one of the clips is formed by a retaining tongue carried by the inside branch, while being, in particular, connected to a side edge of said inside branch, and folded over towards the axis of the collar.

The retaining portion is then made mechanically stronger due to it being folded over towards the axis of the collar.

Optionally, when the collar is in the pre-attached state in which it is pre-attached to the first tube, movement of the collar relative to the first tube is limited in the direction going away from the free end of said first tube, which end is provided with the clamping surface of said first tube.

Such limitation may be achieved in different manners.

For example, the clamping system may include a movement-limiting member carried by the second flank. Such a movement-limiting member may also serve to pre-attach the collar to the second tube. That member may, in particular, be a washer. As regards the pre-attachment to the first tube, the individual clips may be dimensioned in such a manner as to offer the desired mechanical strength. As regards the pre-attachment to the second tube, the washer may serve also to provide another function, such as a sealing function. The pre-attachment relative to the second tube may then optionally have lower tear-off strength than the pre-attachment relative to the first tube. For example, the clamping system may be pre-attached in advance to the first tube so as to be incorporated on said first tube, in which case it can need to have very high tear-off strength, whereas the pre-attachment to the second tube may be useful merely at the time of assembly, in which case lower tear-off strength can be sufficient.

In another example, the inside branch of at least one of the clips has a transverse flange projecting towards the axis of the collar.

In which case, movement of the collar relative to the first tube in the direction going away from the free end of the first tube may be limited, even if the clamping system is not provided with a washer or with a specific movement-limiting member co-operating with the second flank of the collar.

Optionally, the inside branch of at least one of the clips is provided with a holding spur projecting into the inside space of the clip between the inside and outside branches.

It is indicated above that it is possible to perform pre-attachment to the second tube by means of a washer, e.g. a washer that also has a sealing function. It is also possible to achieve the pre-attachment to the second tube by using individual clips that are analogous to the clips that are described in the present specification, and that are placed on the second flank of the collar.

BRIEF DESCRIPTION OF THE DRAWINGS

The present disclosure can be well understood on reading the following detailed description of embodiments shown by way of non-limiting example. The specification refers to the accompanying drawings, in which:

FIG. 7A is a view corresponding to the FIG. 5A view, but showing yet another embodiment of the clip;

FIGS. 7B and 7C are respectively a side view and a perspective view of the clip shown in FIG. 7A;

DETAILED DESCRIPTION OF THE DISCLOSURE

The collar of the clamping system of the present specification is, for example, generally analogous to the one that is described in Documents EP 1 451 498 and EP 2 598 785.

Figure 1:
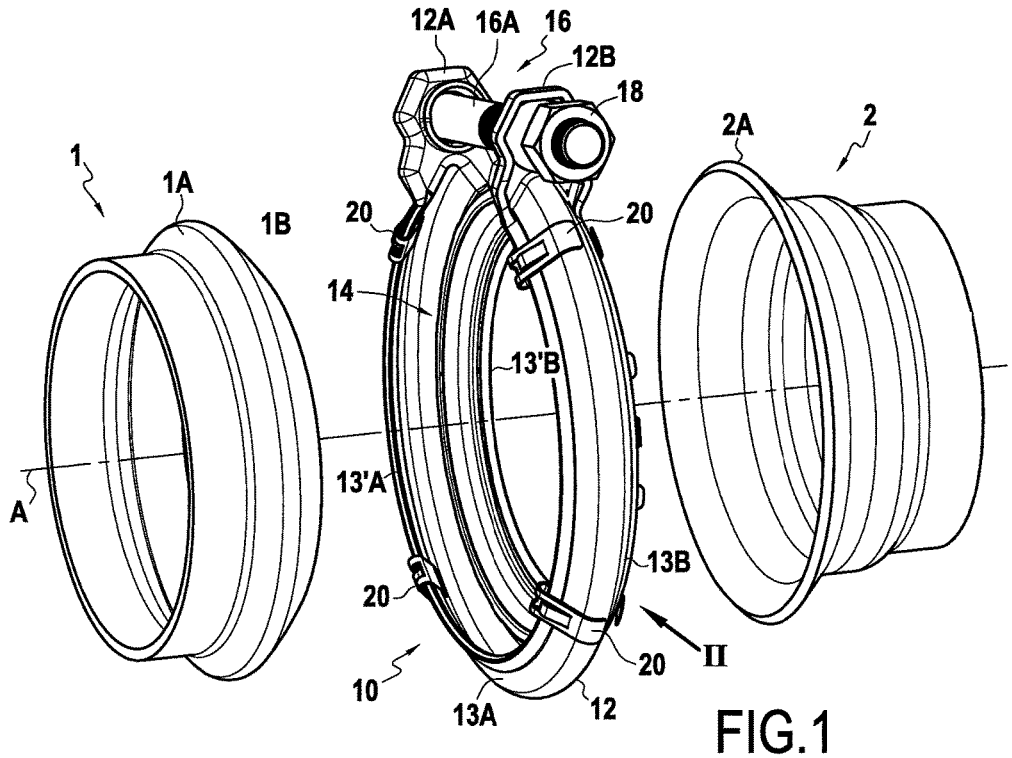
FIG. 1 is a perspective view showing the clamping system and the ends of two tubes before said system is assembled onto said ends, the clamping system being seen from a first side.
Figure 2:
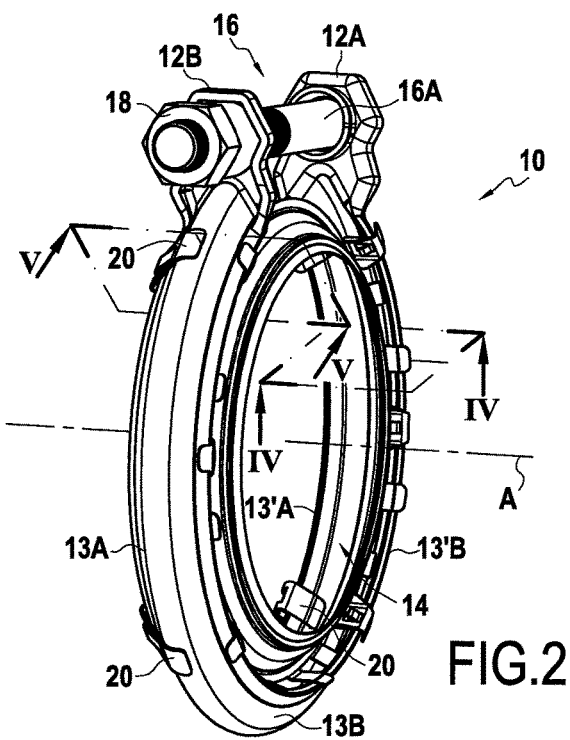
FIG. 2 is a perspective view of the clamping system shown from a second side, looking along arrow II of FIG. 1.
Figure 3:
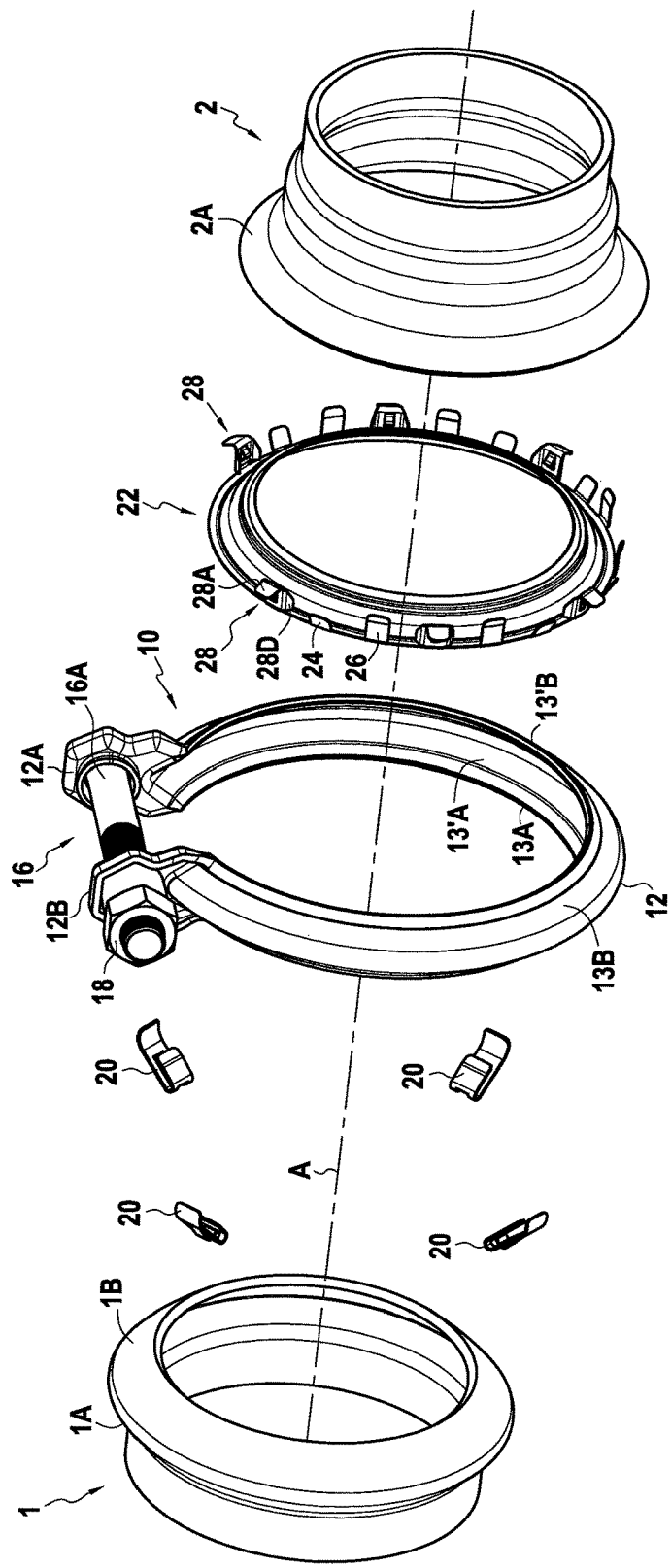
FIG. 3 is an exploded perspective view showing the various component elements of the clamping system before they are assembled, and the ends of the two tubes.

Thus, as can be seen, in particular, in FIGS. 1 to 3, said collar 10 has a band 12 that has a first flank 13A and a second flank 13B between which an inside trough 14 is defined.

Throughout the description below, and unless otherwise indicated, the term "inside" is used to describe elements that face towards the axis A of the collar or that are closer to that axis A relative to other elements that are said to be "outside", "outside" elements also being those that face away from the axis A.

The clamping system serves to connect two tubes together via their ends. Thus, FIG. 1 shows a first tube 1 and a second tube 2 respectively having a first clamping surface 1A and a second clamping surface 2A that project relative to their respective cylindrical outside surfaces. For assembling together the tubes 1 and 2, the clamping system can be disposed around the assembled-together ends of the tubes, so that the clamping surfaces 1A and 1B find themselves in the trough 14 in the band 12. In this situation, the flanks 13A and 13B co-operate with respective ones of the clamping surfaces 1A and 2A, so that tightening the collar holds the two ends together.

In this example, the band 12 is V-shaped in cross-section, i.e. the flanks 13A and 13B face towards the axis A, while tending to flare progressively further apart from each other going towards their respective inside ends 13'A and 13'B. The clamping surfaces 1A and 2A have diameters that gradually increase going towards the facing free ends of the tubes, e.g. by being frustoconical. Thus, tightening the collar onto the ends of the tubes to be assembled together tends to bring said ends closer together. In this example, the free end of the first tube 1 has an end skirt 1B that, starting from the vertex of the clamping surface 1A, tends to taper so that it becomes progressively closer to the axis of the tube. In particular, this end skirt 1B may have a frustoconical shape that matches the inside periphery of the clamping surface 2A of the second tube. Naturally, for performing the assembly, the axes of the tubes 1 and 2 are aligned with each other and are coaxial with the axis A of the collar.

The band 12 of the collar can be tightened. In this example, said band 12 has ends, respectively 12A and 12B, which are turned out substantially radially in such a manner as to form bearing tabs. These tabs are provided with holes so as to enable the shank 16A of a bolt 16 to pass through said tabs. In a manner known per se, the head 16B of the bolt (see FIG. 12) can be retained relative to the bearing tab 12A, while a nut 18 co-operates with the tab 12B, so that the bolt and nut being turned relative to each other in the tightening direction urges the bearing tabs 12A and 12B towards each other and thus reduces the inside diameter of the collar, i.e. makes it possible to tighten the band.

The clamping system also includes a plurality of individual clips 20 that are distributed angularly around the first flank 13A. As explained more clearly below, each clip is retained on the flank 13A in the manner of a pinching clip, i.e. the flank is pinched between the inside and outside branches of the clip.

In this example, the clamping system also includes a washer 22, which is carried by the second flank 13B. For example, this washer is analogous to the washer 28, 128 of the clamping system described in Document EP 1 451 498.

As explained below, the individual clips 20 make it possible to retain the clamping system in the pre-attached state in which it is pre-attached to the first tube, by co-operating with the clamping surface 1A of said first tube, while the washer makes it possible to retain this system in the pre-attached state in which it is pre-attached to the second tube, the washer co-operating with the clamping surface 2A, and while the ends of the tubes are brought closer together so that the two bearing surfaces 1A and 2A find themselves in the trough 14 in the band 12.

Figure 4:
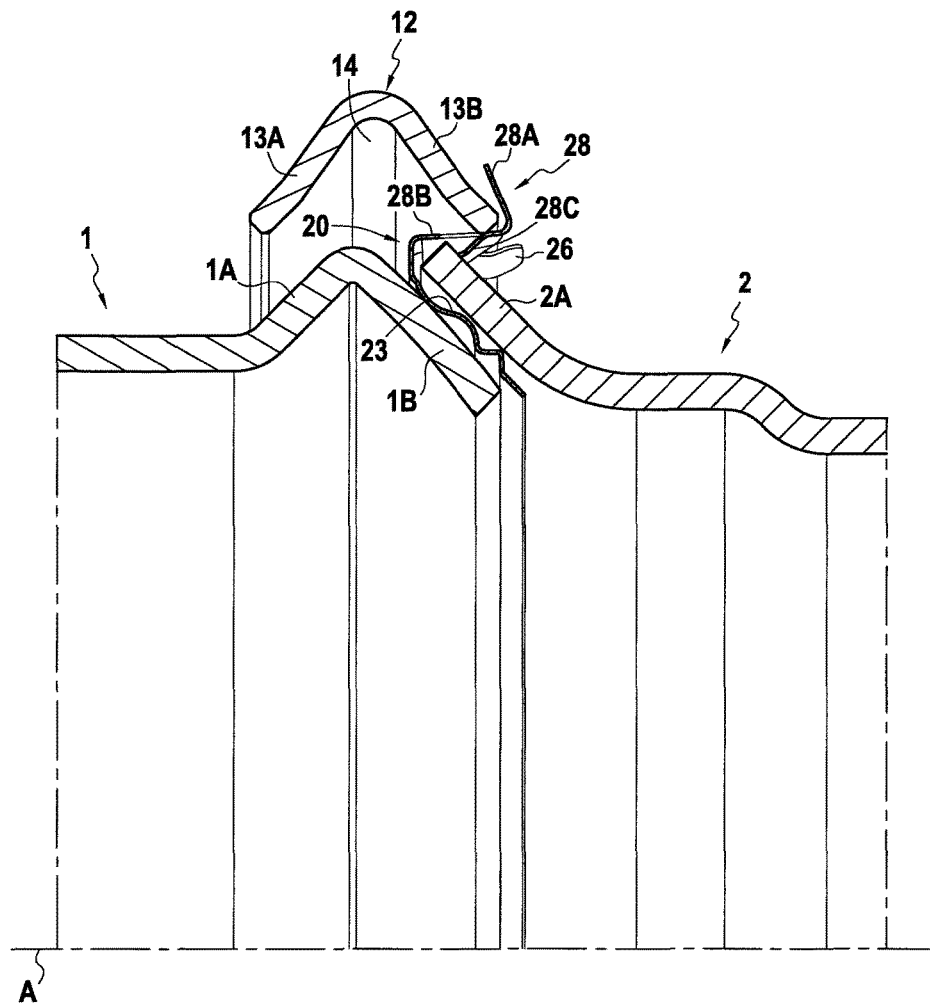
FIG. 4 is a section view on the section plane IV-IV of FIG. 2.

With reference, in particular, to FIGS. 3 and 4, it can be seen that the washer 22 has a substantially frustoconical ring 23 that, when the two tubes are in the assembled-together state, is disposed between the inside periphery of the clamping surface 2A of the tube 2 and the outside periphery of the skirt 1B of the tube 1. Said ring may have undulations that, during the tightening, are deformed, so as to provide sealing between the surfaces of the tubes with which they co-operate.

The washer 22 is retained relative to the collar 10 by co-operating with the flank 13B of the band 12. To this end, the washer is provided with fastening tabs, which, in this example, are of different types. In particular, they comprise inside tabs 24 that, when the collar is in the non-tightened state, come to bear against the inside surface of the flank 13B, outside tabs 26 of a first type that are longer than the inside tabs 32 and that extend substantially parallel to the axis A in such a manner as to co-operate with the inside edge 13'B of the flank 13B, and outside tabs of a second type 28 that co-operate with the outside periphery of the flank 13b via their hook-shaped free ends 28A. The middle portions 288 of these tabs are provided with tongues 28C that, as can be seen in FIG. 4, come to hold onto the clamping surface 2A, and said middle portions also have inclined axial edges 28D that also come to hold onto the clamping surface 2A when the free end of the tube 2 is inserted into the trough 14 in the band of the collar, over the ring 23 of the washer 22.

Figure 5A:
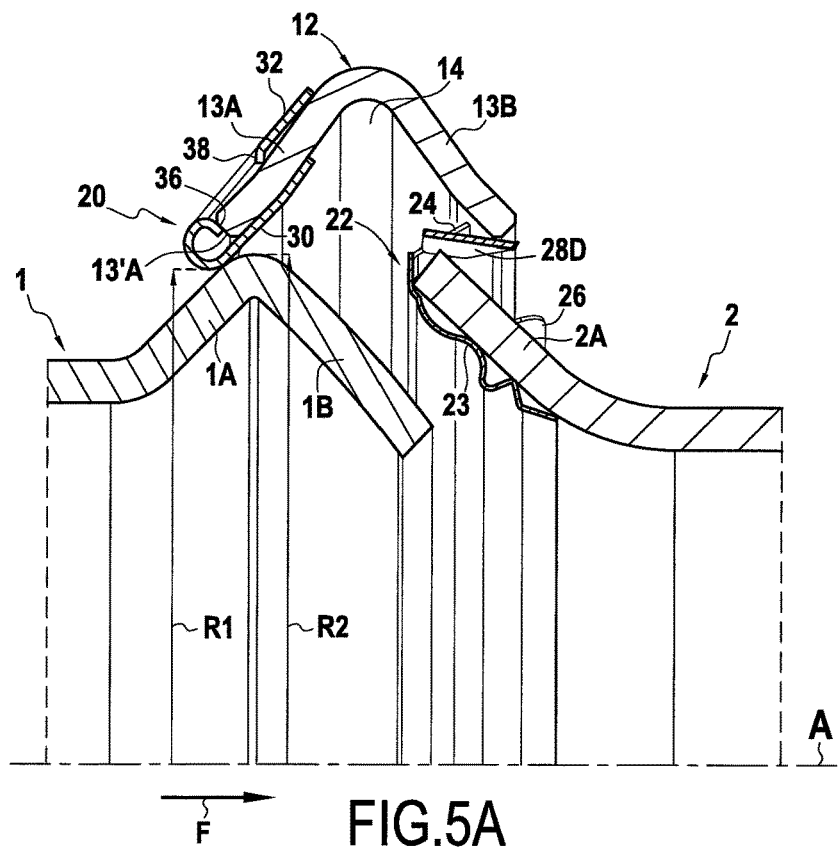
FIG. 5A is a section view on the section plane V-V of FIG. 2.

With reference, in particular, to FIGS. 3, 5A, 5B, and 5C, the individual clips are described below. To make FIG. 5A clearer, the space between the ends of the tubes to which the clamping system is pre-attached is exaggerated. Each of the clips 20 has an inside branch 30 and an outside branch 32 that face each other. In particular, these branches face each other axially. As can be seen in FIG. 5A, the flank 13A of the band 12 of the collar is pinched between said inside and outside branches. The clip 20 has a retaining portion 34 situated radially towards the inside, and the outside branch 32 has a first bearing zone 36 which, as can be seen in FIG. 5A, co-operates with a first bearing surface of the collar, which surface is, in this example, formed by the inside edge 13'A of the flank 13A. In this example, when the clip 20 pinches the first flank 13A, the inside edge 13'A comes to bear on the bearing zone 36, thereby tending to urge the retaining portion 34 back towards the axis of the collar. This makes it possible to guarantee that the retaining portion 34 finds itself at the desired distance relative to the inside edge 13'A of the flank 13A, i.e., considered together, the retaining portions 34 of the various clips 20 distributed angularly around the first flank define the desired radial dimensions, slightly less than the radius R2 of the vertex of the bearing surface 1A. However, the retaining portion 34 being urged back towards the axis A of the collar is achieved by resilient return. Thus, when the clamping system is put in place on the first tube, the free end of said first tube can be inserted into the inside trough 14 in the band, the vertex of the clamping surface 1A then co-operating with the retaining portions 34 to push the clips 20 resiliently and radially outwards, and then once the vertex of the bearing surface finds itself in the trough 14, the clips return resiliently to their pre-attachment retaining positions, in which, as shown in FIG. 5A, the retaining portions 34 of the various clips define radial dimensions R1 that are less than the radius R2. The collar 10 is thus retained in the pre-attached state in which it is pre-attached to the first tube, i.e. movement of the collar relative to the first tube in the direction F going towards the free end of the first tube is limited by the retaining portions co-operating with the first clamping surface 1.

In this example, the retaining portion 34 is formed at the junction where the inside and outside branches meet.

The bearing zone 36 is formed on a bearing tongue 37 that is cut out from the outside branch 32 and that projects into the inside space 21 of the clip defined between its inside and outside branches 30 and 32. In this example, the bearing tongue 37 is connected to the outside branch 32 in the vicinity of the junction where the inside and outside branches meet.

It can also been seen that the outside branch 32 of the clip 20 has a holding spur 38 that projects into the inside space 21 of the clip. As can be seen in FIG. 5A, this spur co-operates with the outside surface of the flank 13A of the band 12 to hold onto said band by tending to oppose movement of the clip relative to the flank 13A towards the axis A of the collar. Said spur 38 is situated some distance from the junction where the inside and outside branches meet, e.g. in the vicinity of the free end of the outside branch, in such a manner as to positioned in contact with the outside surface of the flank 13A when the clip pinches said flank. In this example, the spur 38 is formed by being cut out from the outside branch 32 and folded over inwards towards the axis A.

It can be seen in this example that the tongue 37 and the spur 38 are situated on two opposite edges of a window 40 cut out from the outside branch 32. Thus, the outside branch has two uninterrupted marginal portions on either side of said window 40. Provision could be made to have a reverse configuration, with an uninterrupted central portion, with at least one of its edges being provided with a notch having its inside edge folded over to form the tongue 37, and with the outside edge folded over to form the spur 38. Provision could also be made for the clip to have a window of the same type as the window 40, and to have one or more side notches, with a tongue 37 situated either on the inside edge of the window, or on the inside edge of a notch, and a holding spur 38 situated either on the outside edge of the window, or on the outside edge of the notch.

Figure 5B:
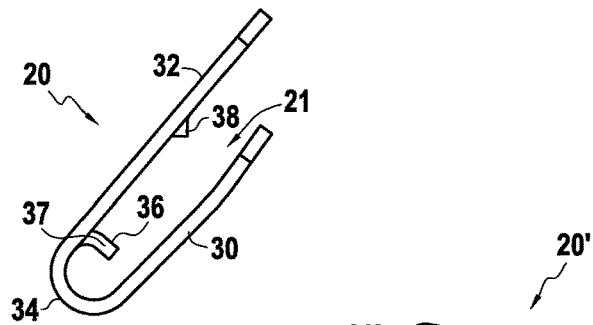
FIGS. 5B and 5C are respectively a side view and a perspective view of the clip shown in section in FIG. 5A.
Figure 5C:
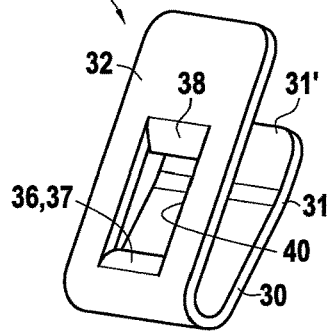
Figure 5D:
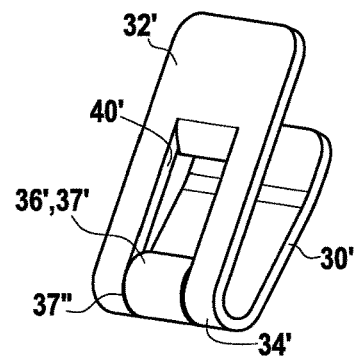
FIG. 5D is a perspective view of a variant embodiment of said clip.

FIG. 5D shows a clip 20' that is variant of the clip 20 and that is entirely analogous thereto except that the tongue 37', the outside surface of which forms, the bearing zone 36', has longitudinal edges 37'' that are longer, the inside edge of the window 40' being situated in the junction zone where the inside and outside branches 30' and 32' meet, or indeed as far as in the inside branch 30'. However, the end of the tongue 37', the outside surface of which forms the bearing zone 36', projects into the inside space of the clip starting from its outside branch 32'. The retaining portion 34' of the clip 20' is also situated at the junction where its inside and outside branches meet.

Figure 6A:
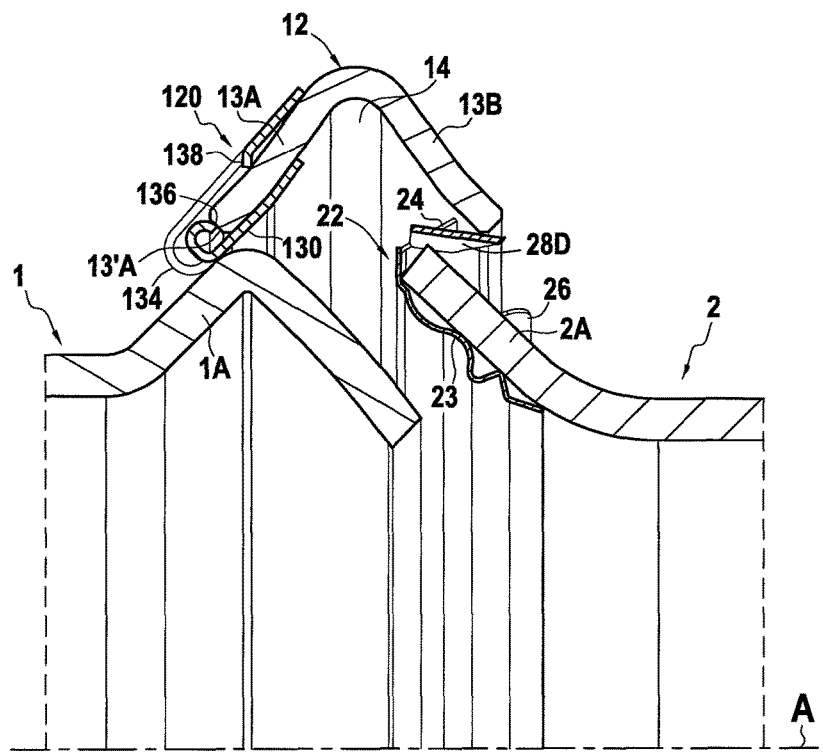
FIG. 6A is a view corresponding to the FIG. 5A view, but showing another embodiment of the clip.
Figure 6B:
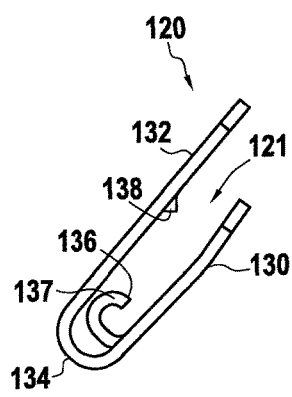
FIGS. 6B and 6C are respectively a side view and a perspective view of the clip shown in FIG. 6A.
Figure 6C:
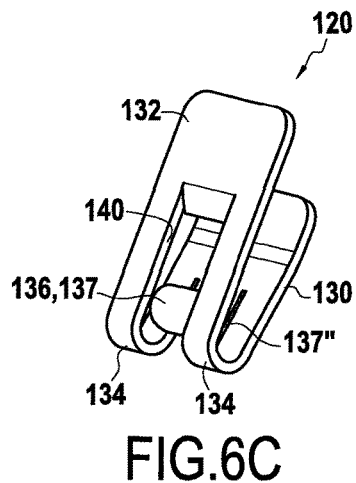

A description is given below of FIGS. 6A and 6C, in which the clip is slightly different from the clips shown in the preceding figures. In FIGS. 6A to 6B, this clip is designated by reference 120, the other elements being designated by the same references as in the preceding figures, plus 100. This clip 120 has an inside branch 130 and an outside branch 132. Its retaining portion 134 is formed at the junction where the inside and outside branches meet, i.e. as in the clips shown in the preceding figures, in the fold zone between the inside and outside branches.

The bearing zone 136 is also formed by the outside surface of a tongue 137 that is folded over into the inside space 121 of the clip. In this clip, this tongue 137 is folded over starting from the inside branch 130 to which it is connected, in the vicinity of the junction where the inside and outside branches meet. In this example, it is only the curved free end portion of the tongue 137 that projects into the inside space 121, the remainder of the tongue lying substantially in the plane of the inside branch 130.

The clip is provided with a window 140 that extends from a region of the outside branch that is in the vicinity of its free end to as far as into the inside branch. Starting from where it is attached to the inside branch 130, the tongue 137 extends substantially in the plane of said inside branch while going towards the retaining portion 134, and is then curved over to be folded over into the inside space 121 of the clip, set back from the junction where the inside and outside branches meet. In the vicinity of where the tongue 137 is attached to the inside branch, the edges 137'' of said tongue are cut out from the inside branch over a length that is, for example, about ⅓ of the length of the inside branch, in such a manner as to impart a relatively large amount of springiness to said tongue. The clip 120 also has a holding spur 138 that is, in this example, formed on the edge of the window 140 that is adjacent to the free end of the outside branch 132. As indicated with reference to FIGS. 5B and 5C, the configuration could be reversed, by making provision for the tongue 137, and optionally the spur 138, to be formed in side notches in the branches.

A description is given below of FIGS. 7A to 7C that also differ from FIGS. 5A to 5C only by the shape of the clip 220. In this example, this clip 220 is identical to the above-described clip 20, except as regards the shaping of the free end of its outside branch 232. In particular, it can be seen that the clip has the inside and outside branches 230, 232, the tongue 237 with its outside surface 236 forming the bearing zone, the window 240 analogous to the window 40, the holding spur 238, and the retaining portion 234. However, the outside branch 232 is extended relative to the outside branch of the clip 20. This outside branch has a free end portion 232' that is curved over inwards so as to cover the junction zone 13' where the flanks 13A and 13B of the band 12 of the collar meet. The cover formed in this way contributes to retaining the clip when it pinches the flank 13A by opposing movement of said clip towards the axis A of the collar. Naturally, such a curved-over extension of the outside branch may also be used in the clips shown in FIGS. 5A to 5D and 6A to 6C.

Figure 8A:
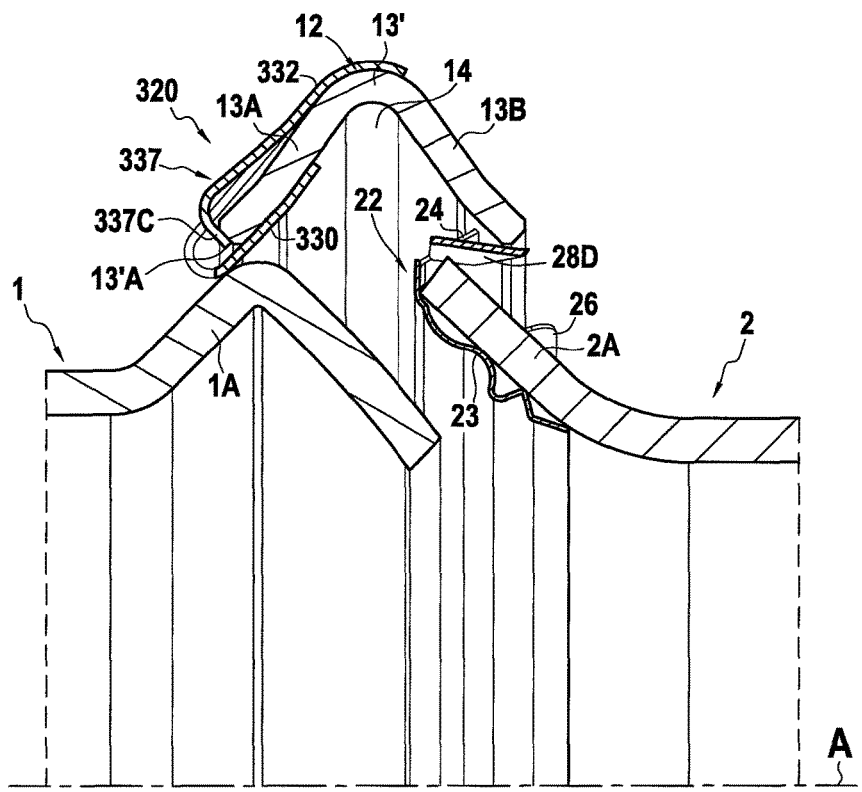
FIG. 8A is a view corresponding to the FIG. 5A view, but showing yet another embodiment of the clip.
Figures 8B, 8C:
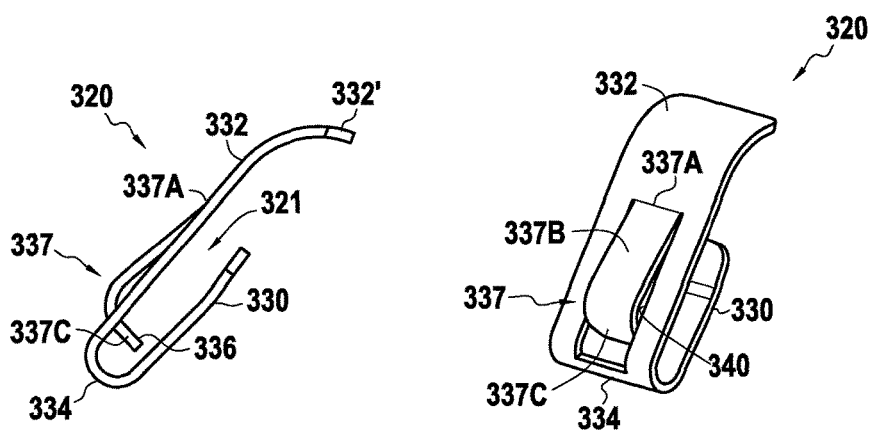
FIGS. 8B and 8C are respectively a side view and a perspective view of the clip shown in FIG. 8A.

A description is given below of FIGS. 8A to 8C that also differ from FIGS. 5A to 5C by the shape of the clip 320. This clip has an inside branch 330 and an outside branch 332 between which the flank 13A of the band of the collar is pinched, a retaining portion 334 at the junction where its two branches meet, and a bearing zone 336 formed on a tongue 337 that projects into the inside space 321 of the clip. However, in this example, the bearing tongue 337 is connected to the outside branch 332 in a connection zone 337A that is remote from the junction where the inside and outside branches meet. This tongue has a running portion 337B that extends from the link zone 337A towards the junction 334, and an end portion 337C that is folded over into the inside space 321 of the clip. In this example, the running portion 337B of the tongue is slightly raised relative to the outside branch 332 from which it comes, thereby imparting increased springiness to it. As above, the bearing surface of the flank 13A of the collar that comes to bear against the bearing zone 336 is formed by the inside edge 13'A of the flank 13A. In this example, the outside branch 332 of the clip has a free end 332' that is curved over to cover the junction zone 13' where the flanks 13A and 13B of the band of the collar meet. In this example, the clip is not provided with a holding spur of the type of the above-described spurs 38, 138, and 238, but it could be provided with such spurs, e.g. formed on the marginal portions of the outside face of the clip, on either side of the window 340 from which the tongue 337 is cut out.

Figure 9A:
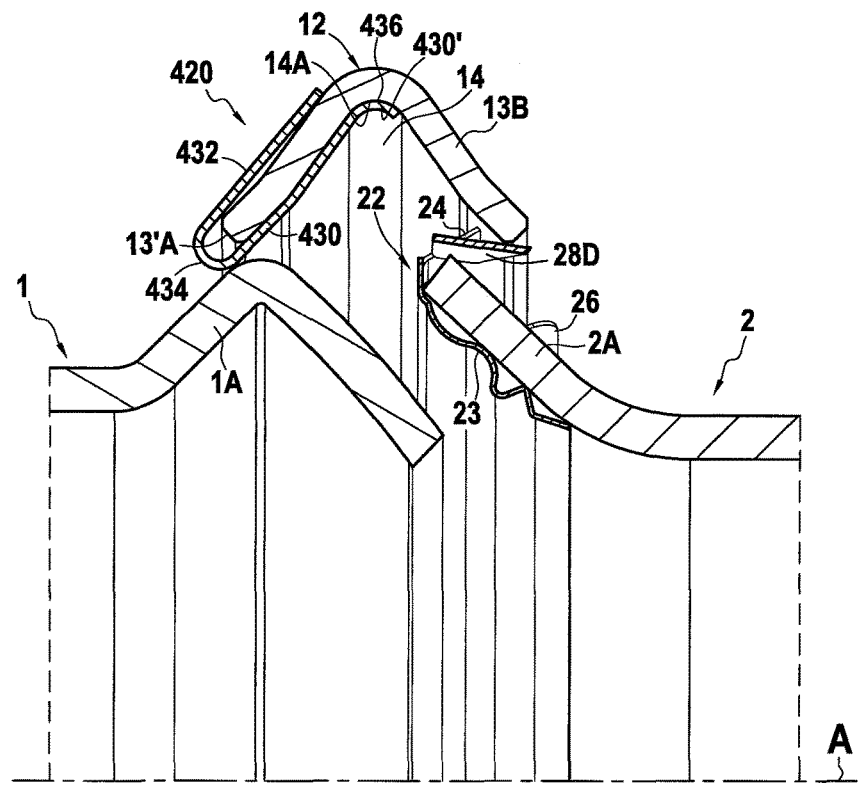
FIG. 9A is a view corresponding to the FIG. 5A view, but showing yet another embodiment of the clip.
Figure 9B:
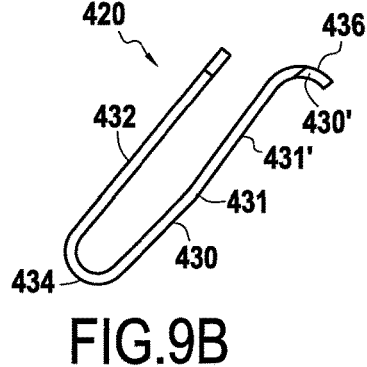
FIGS. 9B and 9C are respectively a side view and a perspective view of the clip shown in FIG. 9A.

A description is given below of FIGS. 9A to 9C that also differ from FIGS. 5A to 5C by the shape of the clip. This clip 420 has an inside branch 430 and an outside branch 432 between which the flank 13A of the band is pinched. However, the bearing zone is formed differently relative to the above-described clips. This bearing zone 436 is formed at the free end of the inside branch 430. More precisely, this inside branch has a free end portion 430' that extends to the end-wall 14A of the trough 14 provided between the flanks 13A and 13B of the band of the collar, and thus comes to bear against said end-wall. The free end portion 430' of the inside branch is curved over inwards, the bearing zone 436 being formed by the outside surface of said curved-over free end portion 430', in contact with the end-wall of the trough 14A. In this example, the outside branch 432 is an uninterrupted band portion. However, it should be understood that, in addition to the above-described bearing zone 436, this clip could have a bearing zone of the same type as the above-described bearing zones 36, 136, 236, and 336.

Figure 9C:
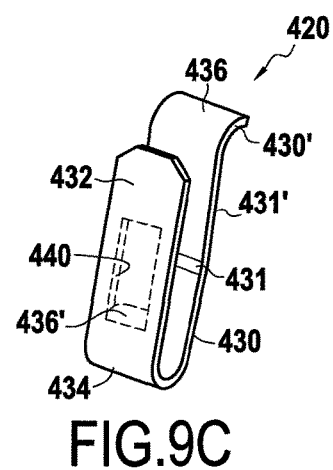

To illustrate this, dashed lines in FIG. 9C indicate the possibility of the outside branch 432 of the clip 420 having a window 440 analogous to the window 40, and a tongue 436' analogous to the tongue 36.

Like for the above-described clips, the retaining portion 434 is situated at the junction where the inside and the outside branches meet.

In the various above-described configurations, and remotely from where it is connected to the outside branch, the inside branch of the clip has a pinching portion that comes back towards the outside branch. For example, the inside branch 30 of the clip 20 has a fold zone 31, the end portion 31' of said inside branch that extends beyond said fold zone coming back inwards. The same shape can be seen on the clips of the other figures, except that, for the clip in FIGS. 9A to 9C, this pinching portion 431' coming back towards the outside branch extends between the fold zone 431 and the free end portion 430' that is curved over inwards.

Provision could also be made for the pinching portion to be formed by a pinching tongue cut out from the inside branch and also forming the bearing zone that co-operates with the bearing surface of the collar. This is, in particular, what is shown in FIGS. 10 to 14B, which are described below. In these figures, the tubes are reversed compared with what is shown in the preceding figures, the first tube 1' that co-operates via its clamping surface 1'A with the clips 520 being analogous to the tube 2 of the preceding figures, while the tube 2', with its clamping surface 2'A and its skirt 2'B, is analogous to the tube 1 of the preceding figures.

Figure 10:
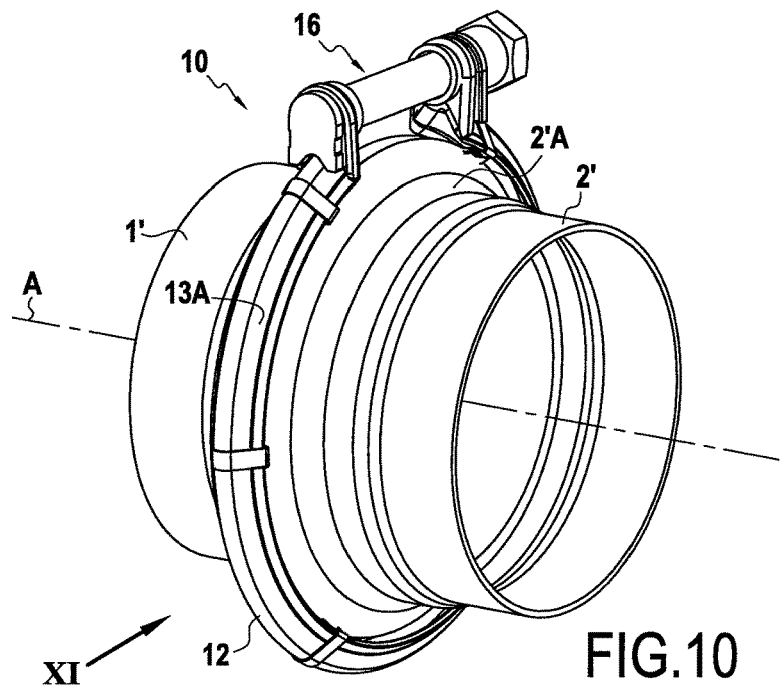
FIG. 10 is a perspective view of another embodiment of the clamping system, as disposed on the assembled-together ends of the tubes, seen from a first side.
Figure 11:
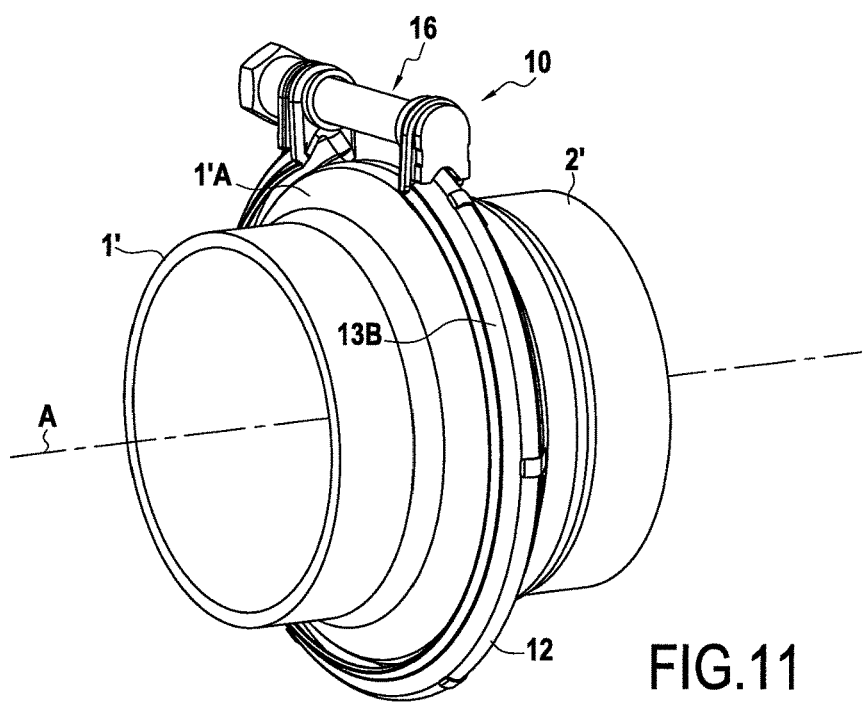
FIG. 11 is a perspective view, seen looking along arrow XI of FIG. 10.
Figure 12:
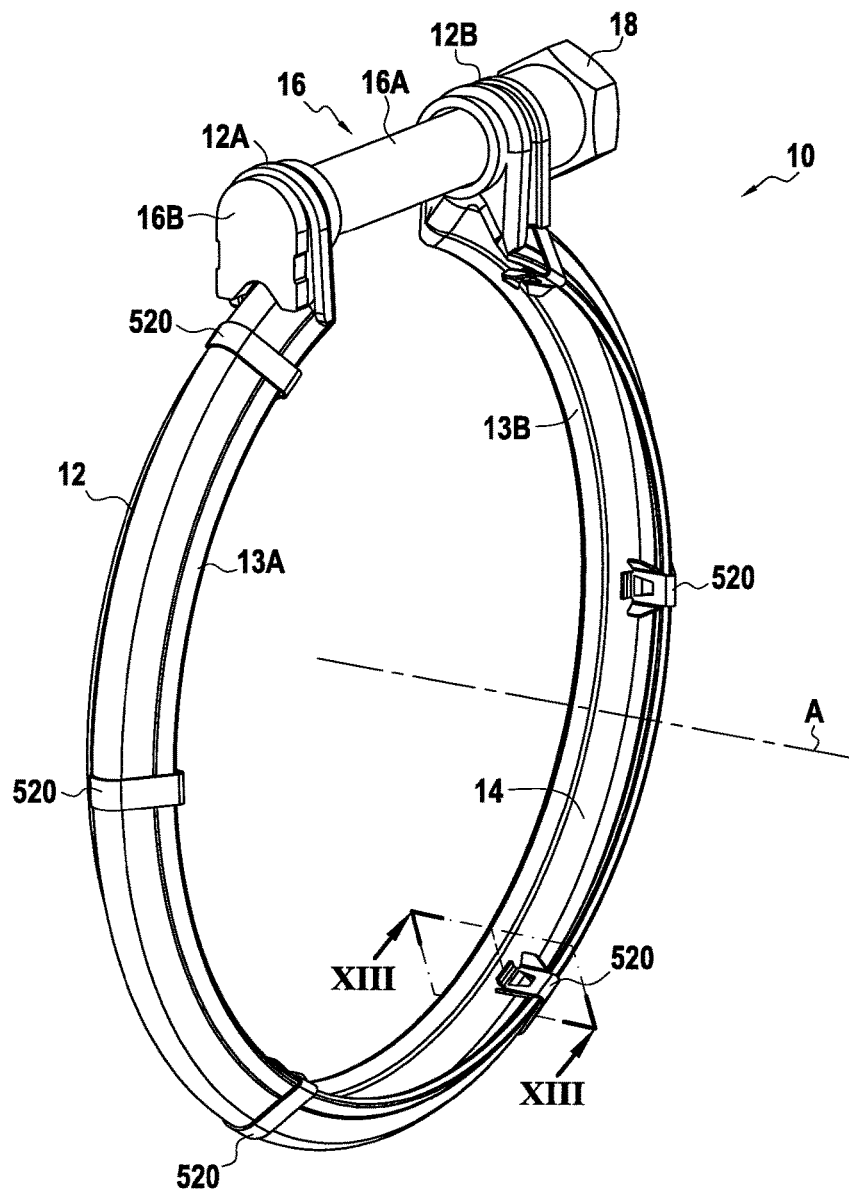
FIG. 12 is a perspective view seen from the same side as the FIG. 10 view and showing the clamping system of FIGS. 10 and 11.

Firstly, FIGS. 10 to 12 are described. The collar shown in these figures is, per se, analogous to the collar shown in the preceding figures, and it is therefore designated by the same references. In this example, the clamping system shown in these figures is not provided with the washer 22 shown in the preceding figures. However, it should be understood that such a washer could be provided because it is compatible with this embodiment.

Figure 13:
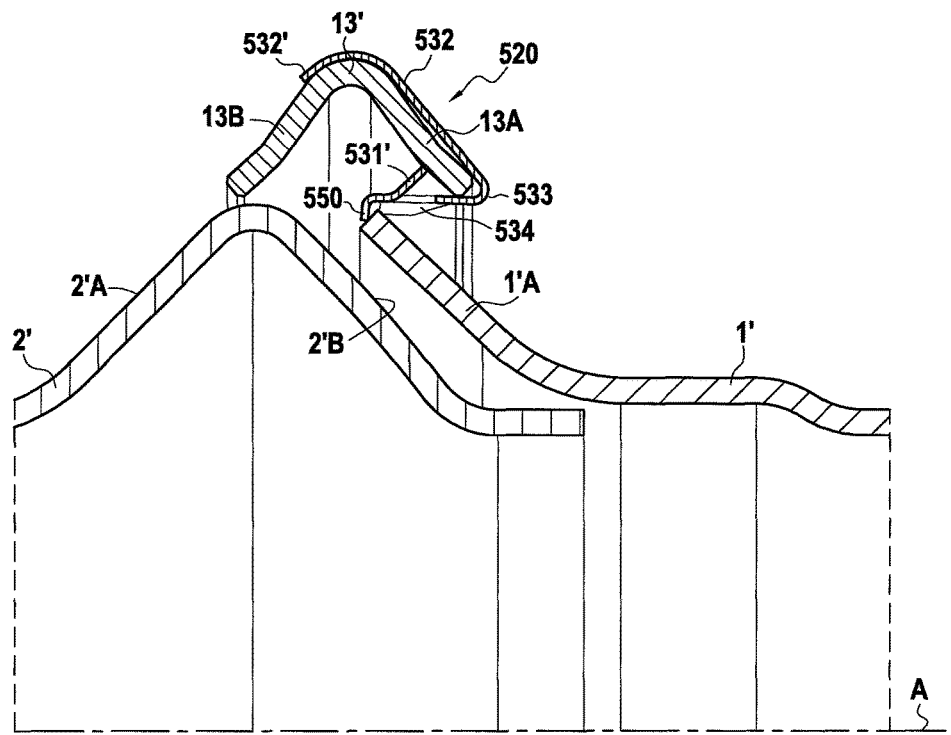
FIG. 13 is a section view on the section plane XIII-XIII of FIG. 12.
Figure 14A:
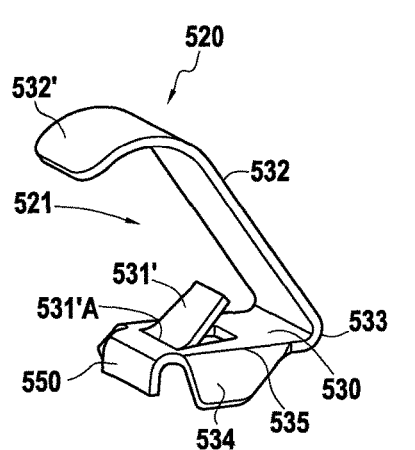
FIGS. 14A and 14B are two perspective views of FIG. 13.
Figure 14B:
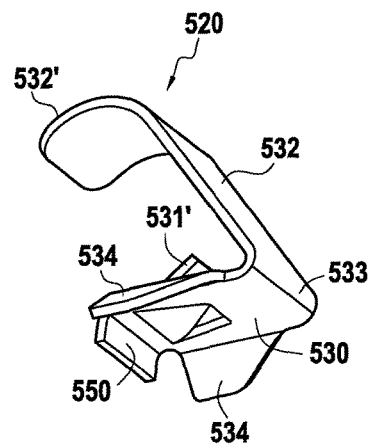

FIGS. 10 and 11 show the clamping system as pre-attached to the ends of the two assembled-together tubes. FIG. 12 shows the clamping system on its own, i.e. the collar as equipped with individual clips 520. With reference more particularly to FIGS. 13, 14A, and 14B, it can be seen that the clip 520 has an inside branch 530 and an outside branch 532, and that the flank 13A of the band 12 of the collar is pinched between said inside and outside branches. However, in order to achieve the pinching, the outside branch 532 extends against the outside surface of the flank 13A, and on the inside branch, the clip is provided with a pinching portion 531' that is formed by a pinching tongue, cut out from the inside branch 530 and raised relative thereto into the inside space 521 of the clip, between its inside and outside branches. FIG. 13 shows that, when the clip is assembled onto the flank 13A, the free end of the pinching tongue 531' rests against the inside surface of the flank 13A. This flank is thus pinched between said free end and the outside branch. Said pinching tongue 531' also forms a bearing zone that co-operates with the inside surface of the first flank 13A while tending to urge the retaining portion 534 of the clip resiliently back towards the axis A of the collar. In particular, the tongue 531' is raised into the inside space 521 of the clip from its connection 531'A where it is connected to the inside branch, which connection is situated some distance away from the junction zone 533 where the inside and outside branches meet.

In this example, the retaining portion 534 of the clip is formed by two retaining tongues 534 that are carried by the inside branch 530 while being, in particular, connected to a side edge 535 of said inside branch, and that are folded over towards the axis of the collar. As can be seen in FIG. 13, the free edges of the branches 534 thus rest on the clamping surface 1'A of the tube 1 when said tube is inserted in the trough 14 in the band 12, so as to retain the collar in the pre-attached state relative to said clamping surface 1'A. To limit the extent to which the free end of the tube 1' advances into the inside trough, in this pre-attached state, the clip 520 has a transverse flange 550 that projects towards the axis of the collar. In FIG. 13, it can be seen that, in the pre-attached state, the free edge of the clamping surface 1'A comes into abutment against the rear face of the transverse flange 550.

It can also be observed that the free end 532' of the outside branch 532 of the clip 520 extends as far as to cover the junction zone 13' where the flanks 13A and 13B meet, by being curved over inwards. This thus contributes to opposing excessive movement of the clip relative to the flank 13A in the direction going towards the axis A.

As in the preceding embodiments, when the collar is engaged over the clamping surface 1'A, said clamping surface co-operates with the retaining portion 534 to deform the clip elastically, and said clip is resiliently urged back towards the axis A of the collar so that its retaining portion defines a radius less than the maximum radius of the clamping surface of the first tube, in such a manner as to retain the collar pre-attached on said surface. In the clip of FIGS. 10 to 14B, it is the inside branch 530 as a whole that flexes resiliently, while being urged back towards the axis A by the pinching tongue 531' that also forms the first bearing zone.

As indicated above, the clamping system of FIGS. 10 to 14B does not have the washer 22 shown in the preceding figures. Generally, its flank 13B does not have a washer or a clip serving to retain the tube 1 in the pre-attached state in the inside trough 14. Naturally, provision could be made to equip said flank 13B with a washer analogous to the washer 22, or indeed with clips, in particular analogous to the clips described above with reference to FIGS. 1 to 9C. During tightening, the two tubes are urged together, and the inside branch 530 of the clip 520 folds over against the inside surface of the flank 13A by plastic deformation, the folded-over edge 550 thus no longer opposing advance of the first tube 1' towards the second tube 2'.

In the examples shown in FIGS. 1 to 9C, the washer 22 serves not only to achieve pre-attachment relative to the second tube, but also to limit movement of the collar relative to the first tube 1 in the direction going away from the free end of said first tube.

The clips described in this specification are, in particular, made of metal, from a simple strip of metal that is folded, and, where necessary, cut out. Similarly, the collar and the washer, when one is present, may be made of metal.

The invention claimed is:

1. A clamping system for connecting two tubes together in sealed manner, the facing ends of the two tubes having clamping surfaces that project relative to the cylindrical outside surfaces of said tubes, the system comprising a collar having a band suitable for co-operating with said clamping surfaces and for being tightened, the band having a first flank and a second flank between which an inside trough is defined that is suitable for receiving the clamping surfaces, the clamping system further comprising a plurality of individual retaining clips distributed angularly around the first flank, each clip having an inside branch and an outside branch facing each other, and between which the first flank is pinched, and a retaining portion situated radially further towards the inside, one of said branches carrying a first bearing zone that co-operates with a first bearing surface of the collar that faces towards the axis of said collar, for resiliently urging the clip back towards the axis of the collar in such a manner that the retaining portion is suitable for co-operating with the clamping surface of the first tube to retain the collar in a pre-attached state in which said collar is pre-attached to said tube while limiting movement of the collar relative to the first tube in the direction going towards the free end of said first tube, which end is provided with the clamping surface of said first tube.

2. A clamping system as claimed in claim 1, wherein the first bearing surface of the collar is formed on the inside edge of the first flank.

3. A clamping system as claimed in claim 1, wherein, for at least one of the clips, the first bearing zone is formed on a bearing tongue cut out from one of the inside and outside branches.

4. A clamping system as claimed in claim 3, wherein the bearing tongue is cut out from the outside branch and projects into the inside space of the clip between the inside and outside branches, at least via its free end.

5. A clamping system as claimed in claim 4, wherein the bearing tongue is connected to the outside branch in the vicinity of a junction where the inside and outside branches meet.

6. A clamping system as claimed in claim 4, wherein the bearing tongue is connected to the outside branch in a connection zone remote from the junction where the inside branch and the outside branch meet, and has a running portion that extends from said connection zone towards said junction and an end portion folded over into the inside space of the clip.

7. A clamping system as claimed in claim 3, wherein the bearing tongue is cut out from the inside branch and projects into the inside space of the clip between the inside and outside branches, at least via its free end.

8. A clamping system as claimed in claim 7, wherein the free end of the bearing tongue is curved over towards in the inside branch and is suitable for co-operating with the first bearing surface of the collar via a surface coming from the face of the inside branch that faces away from the outside branch.

9. A clamping system as claimed in claim 3, wherein the inside branch has a free end portion that is curved over inwards and that forms a second bearing zone that is suitable, via its outside surface, for co-operating with the end-wall of the inside trough of the band, on which end-wall the second bearing surface of the collar is formed.

10. A clamping system as claimed in claim 1, wherein the inside branch of at least one of the clips has a free end portion that is curved over inwards and that forms the first bearing zone that is suitable, via its outside surface, for co-operating with the end-wall of the inside trough of the band, on which end-wall the first bearing surface of the collar is formed.

11. A clamping system as claimed in claim 1, wherein the outside branch of at least one of the clips has a free end portion that is curved over inwards and that is suitable for covering a junction zone where the first and second flanks of the band meet.

12. A clamping system as claimed in claim 1, wherein, remotely from where it is connected to the outside branch, the inside branch of at least one of the clips has a pinching portion that comes back towards the outside branch.

13. A clamping system as claimed in claim 12, wherein the pinching portion is formed by a pinching tongue, cut out from the inside branch and also forming the first bearing zone that co-operates with the inside surface of the first flank on which the first bearing surface of the collar is formed.

14. A clamping system as claimed in claim 1, wherein the retaining portion of at least one of the clips is formed at the junction where the inside and outside branches meet.

15. A clamping system as claimed in claim 1, wherein the retaining portion of at least one of the clips is formed by a retaining tongue carried by the inside branch and folded over towards the axis of the collar.

16. A clamping system as claimed in claim 1, wherein, when the collar is in the pre-attached state in which it is pre-attached to the first tube, movement of the collar relative to the first tube is limited in a direction going away from the free end of said first tube, which free end is provided with the clamping surface of said first tube.

17. A clamping system as claimed in claim 16, comprising a movement-limiting member carried by the second flank.

18. A clamping system as claimed in claim 17, wherein the movement-limiting member is a washer.

19. A clamping system as claimed in claim 16, wherein the inside branch of at least one of the clips has a transverse flange projecting towards the axis of the collar.

20. A clamping system as claimed in claim 1, wherein the inside branch of at least one of the clips is provided with a holding spur projecting into the inside space of the clip between the inside and outside branches.

* * * * *